Dec. 18, 1951     W. J. O'BRIEN     2,578,980
RADIO FREQUENCY NAVIGATION SYSTEM
Filed Feb. 2, 1948     5 Sheets-Sheet 1
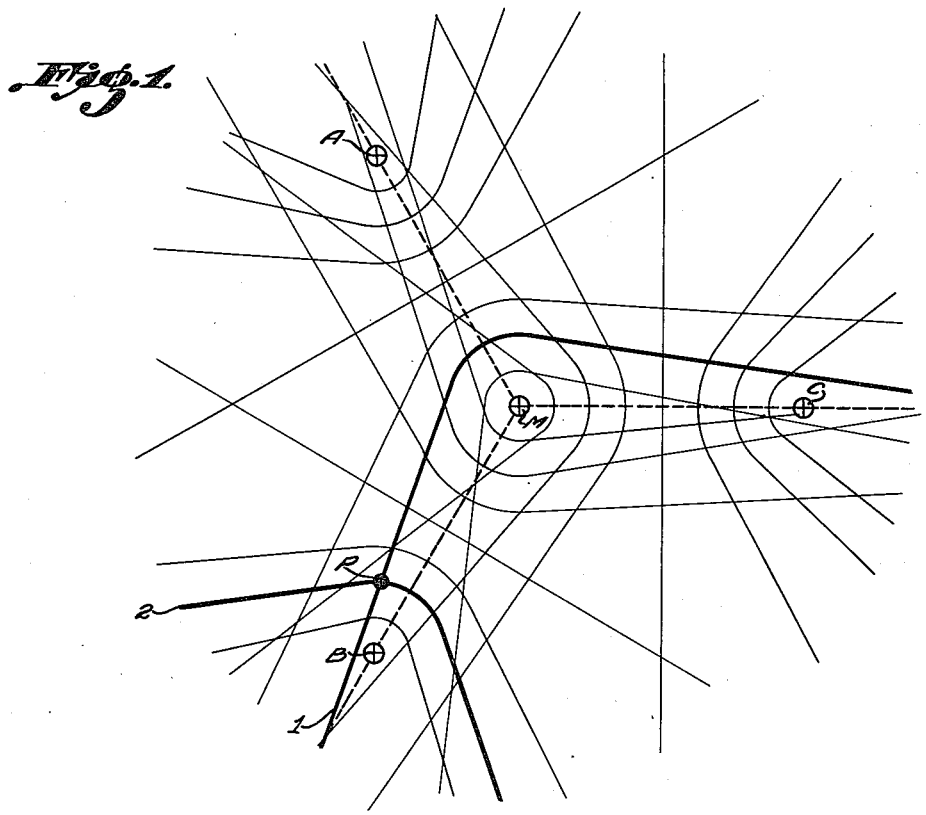
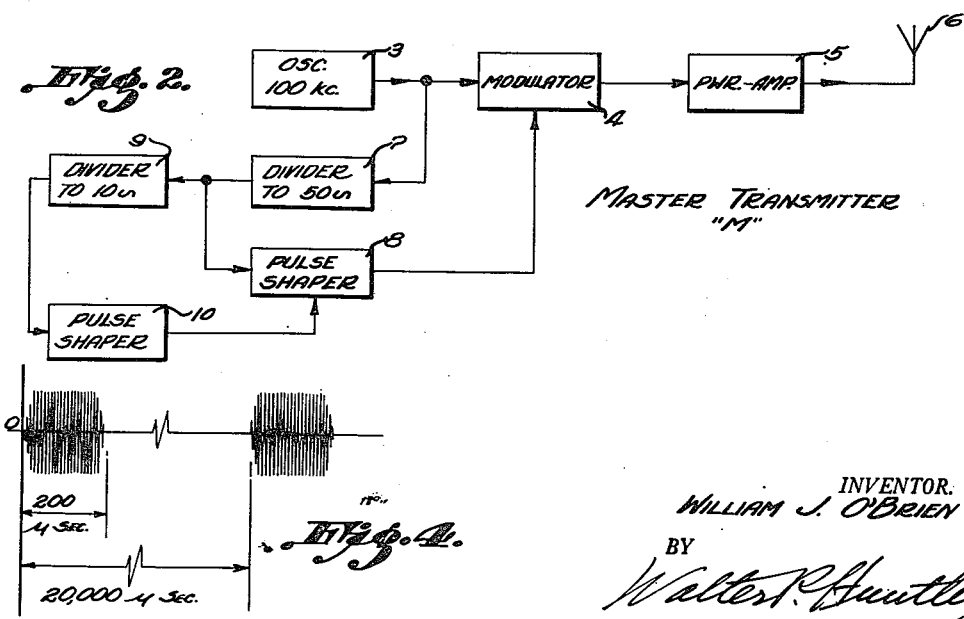
INVENTOR.
WILLIAM J. O'BRIEN
BY Walter P. Huntley
ATTORNEY Dec. 18, 1951         W. J. O'BRIEN         2,578,980
RADIO FREQUENCY NAVIGATION SYSTEM
Filed Feb. 2, 1948         5 Sheets-Sheet 2
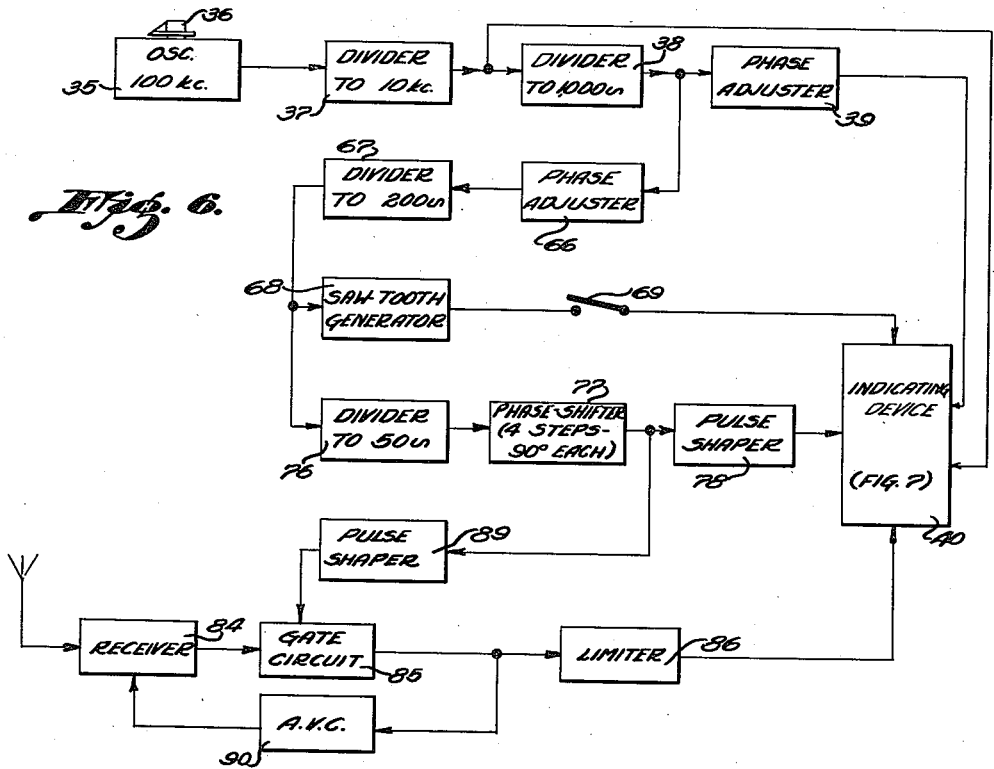
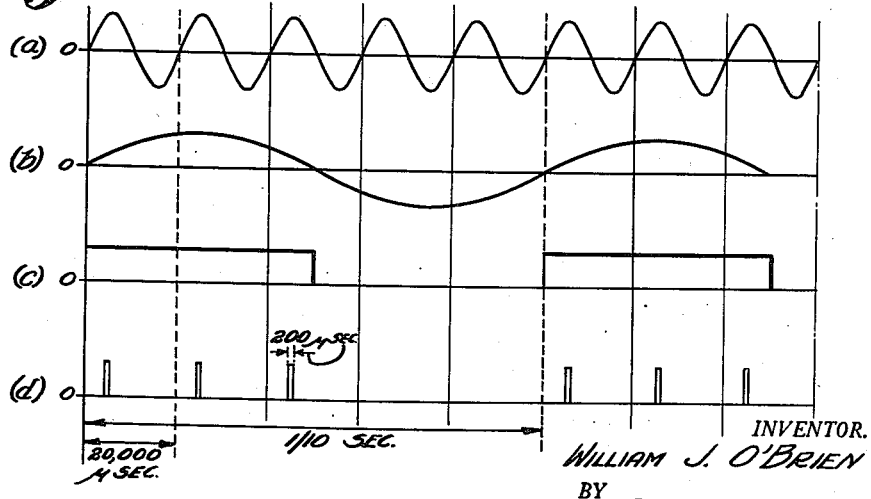
INVENTOR.
WILLIAM J. O'BRIEN
BY
Walter P. Huntley
ATTORNEY

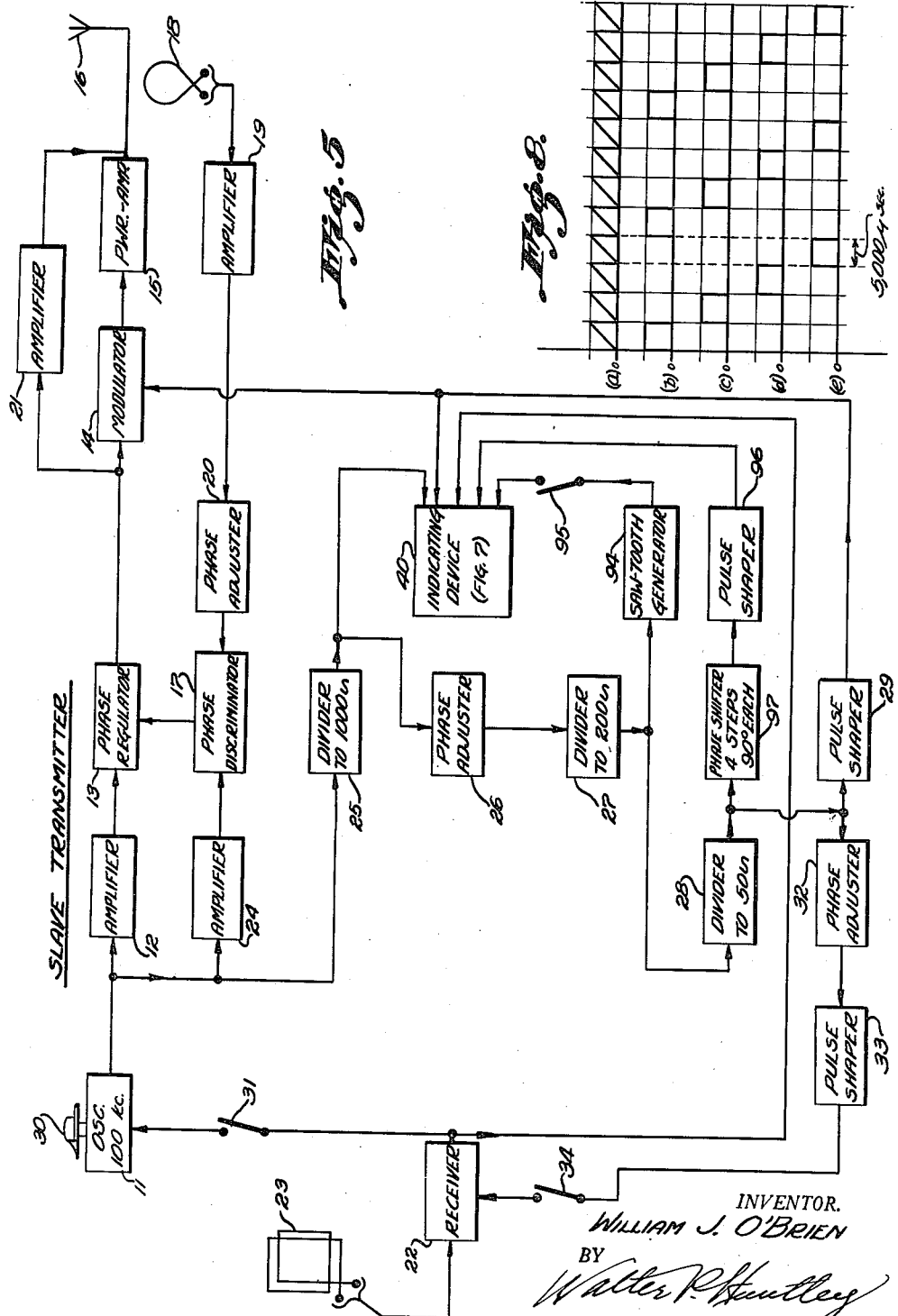

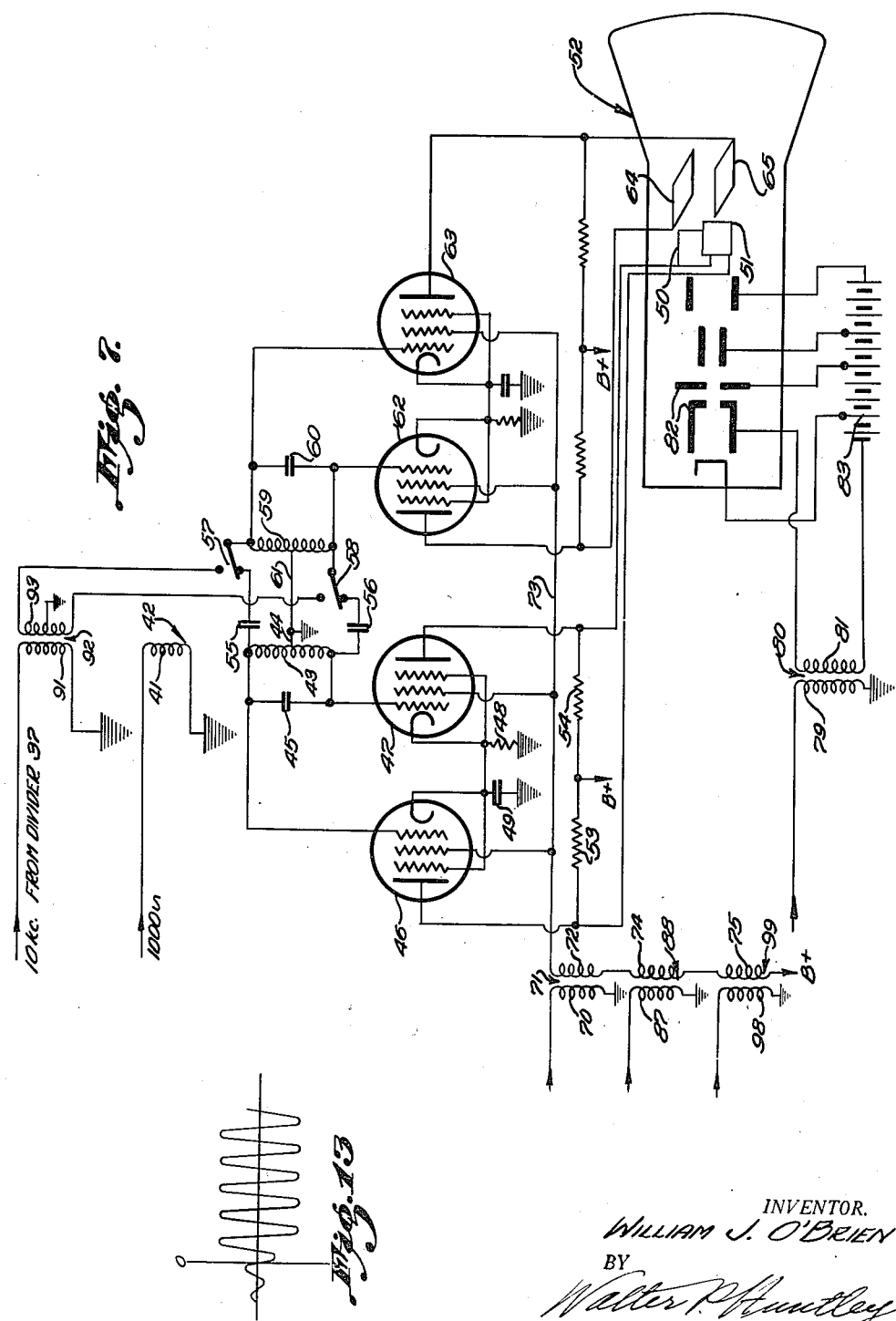

Dec. 18, 1951 W. J. O'BRIEN 2,578,980
RADIO FREQUENCY NAVIGATION SYSTEM
Filed Feb. 2, 1948 5 Sheets-Sheet 5
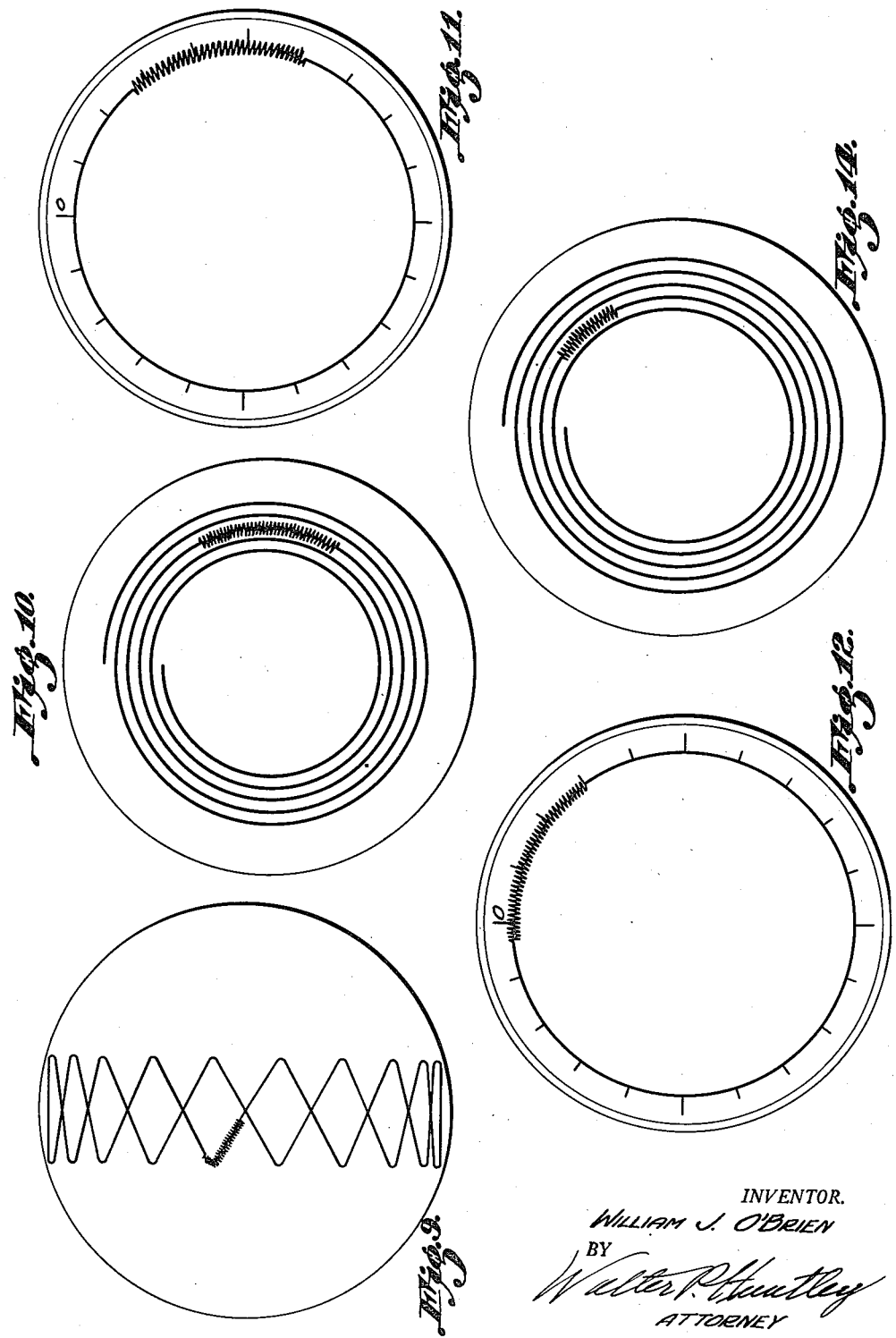
INVENTOR.
WILLIAM J. O'BRIEN
BY
ATTORNEY Patented Dec. 18, 1951

2,578,980

UNITED STATES PATENT OFFICE 2,578,980

RADIO-FREQUENCY NAVIGATION SYSTEM

William Joseph O'Brien, London, England, assignor to The Decca Record Company, Limited, London, England, a corporation of Great Britain Application February 2, 1948, Serial No. 5,878
In Great Britain March 7, 1946

9 Claims. (Cl. 343—103)

This invention relates to radio frequency navigation systems, and has particular reference to a low frequency hyperbolic system of the time-difference type wherein the location of a mobile receiver is determined by measuring the time differences of arrival of synchronized pulses transmitted from a plurality of fixed transmitting stations.

The hyperbolic radio navigation systems known prior to this invention are of two types; i. e., the low frequency phase comparison system wherein the hyperbolic coordinate lines represent lines of equal phase displacement between two unlike but harmonically related frequencies bearing a fixed multiple phase relation to each other, and the high frequency pulse type wherein the hyperbolic coordinate lines represent lines of equal time differences of arrival of synchronized pulses from a plurality of transmitters. In the pulse type of system it has been the practice to use very high frequencies because of the difficulty of measuring the time intervals with the required accuracy at low frequencies. As a result, the pulse type has heretofore been characterized either by short range or low accuracy. The low frequency continuous wave systems, on the other hand, while giving the required accuracy and operating at much greater ranges than do the high frequency pulse types, suffer from the disadvantageous effects of reflected sky wave signals at night at very long ranges. Because of the meter type of data presentation used in such systems, it is difficult to detect the sky wave errors, and impossible to eliminate them by interpretation of the received signals.

The present invention is directed to a new system which embodies the advantageous features of both of the previously mentioned systems while eliminating the disadvantageous features of both. This is accomplished by transmitting pulse type signals at very low frequencies, and providing the necessary controlling and measuring apparatus to permit the time differences to be measured with sufficient accuracy to realize an over-all accuracy comparable to that obtained with the prior systems.

It is therefore an object of this invention to provide a radio frequency navigational system of the pulse type which operates at very low frequencies, and which includes means for measuring the time differences of pulse arrival at a mobile receiving station with an accuracy of one or two microseconds.

It is also an object of this invention to provide a navigation system of the character above referred to wherein the pulses are transmitted from at least three separate locations and in which both the carrier waves and the pulses are controlled in phase.

It is an additional object of this invention to provide a system of the character above referred to in which all transmitting stations operate at the same carrier frequency and at the same pulse repetition rate.

It is a still further object of this invention to provide a system of the character referred to in the preceding paragraphs which includes a mobile receiving means together with a means for accurately measuring the time intervals, which means may comprise a cathode ray oscilloscope utilizing a greatly expanded time base.

It is also an object of this invention to provide in a receiving means of the character referred to in the preceding paragraph, a circuit for producing on the screen of said oscilloscope a spiral time base having an effective length as great as sixty times the usable diameter of the tube screen.

It is an additional object of this invention to provide in a system of the character referred to a monitoring means for permitting the accurate determination at any time of the operating adjustment of the entire system.

Other objects and advantages of this invention will be apparent from a consideration of the following description, read in connection with the accompanying drawings, wherein:

Fig. 1 is a diagrammatic view illustrating the arrangement of transmitting stations, and showing the type of coordinate system produced;

Fig. 2 is a block diagram showing the apparatus used as the master transmitting station of the system;

Fig. 3 is a graph showing the wave forms and time relationships between the signals produced by parts of the apparatus shown in Fig. 2;

Fig. 4 is a graph representing the character of the signals transmitted by each of the transmitters of the system;

Fig. 5 is a block diagram illustrating the apparatus comprising the slave transmitters;

Fig. 6 is a block diagram illustrating the apparatus comprising a mobile receiving apparatus for the system;

Fig. 7 is a wiring diagram showing the apparatus and the electrical connections in an indicating apparatus;

Fig. 8 is a graph showing the wave form and time relationships between certain signals in the receiving apparatus;

Fig. 9 is a front face view of the indicating device showing the indication produced during an adjustment of the receiving apparatus;

Figs. 10, 11, 12, and 13 are front face views of the indicating device showing the indications produced at different stages in the operation of the device; and Fig. 14 is an enlarged representation of the indication showing the manner of adjustment of the scale index.

Briefly described, the system of this invention comprises a mobile receiving apparatus including a time measuring and indicating means adapted to receive signals from a fixed transmitting system. The transmitting system comprises a group of transmitters all operating at the same carrier frequency and spaced from each other a substantial distance, for example 500 or 600 kilometers. The transmitters operate at a low carrier frequency of the order of 100 kc., and the carrier waves from all transmitters are held rigidly in phase with each other. This is accomplished by operating one station as a master and the remainder as slaves employing phase regulating equipment serving to hold the slave carrier frequencies accurately in phase with the master signals. The carrier waves are each pulse-modulated in such a way as to comprise a series of short bursts of radio frequency energy, no energy being radiated between bursts. The pulse repetition rate is made fairly low; for example, 50 cycles per second; and the pulses from each transmitter are staggered in time by equal amounts such as 5000 microseconds, so that each station may in turn transmit its pulse before the first station transmits its second pulse. The time staggering of the pulses is rigidly controlled, and the delay times thus introduced are taken into account automatically by the receiving apparatus.

The receiving apparatus operates to measure the difference between the transmission times from each of the transmitters to the unknown location of the receiving apparatus. These time differences define a series of hyperbolae with each transmitting pair as the respective foci, and the location of the receiver is located on a chart at the intersections of the hyperbolae thus defined.

There is shown in Fig. 1, a typical transmitter layout, the master transmitter M being located in the center of a star arrangement with three slave transmitters A, B, and C being spaced more or less uniformly thereabout and at a radial distance from the master transmitter M of about 600 kilometers. In the ensuing description, numerical values will be assigned to the various frequencies and times by way of example to facilitate an understanding of the invention. The values are given by way of illustration only, it being understood that other times and frequencies may be used so long as the described relationships are preserved.

In Fig. 1, the point P represents the location of a mobile receiver. The location of the point P is defined by the intersection of two hyperbolae 1 and 2 having transmitters M and A, and M and B, respectively, as foci. These hyperbolae are defined by the differences in the distances from M and A to P and from M and B to P. These distance differences are proportional to the time differences of arrival of the pulses at P, so that the location of the point P may be determined by measuring these time differences.

Fig. 2 illustrates, by means of a block diagram, the apparatus comprising the master transmitter M. The source of the radio frequency energy may comprise a suitably stable crystal oscillator 3 which supplies a 100 kc. signal to a modulator 4. The modulator 4 is coupled to a power amplifier 5 which feeds an antenna 6. A portion of the output from the oscillator 3 is fed to a frequency divider 7 which produces a 50 cycle output from the 100 kc. input signal. The 50 cycle output of the divider 7 is fed to a pulse shaper 8 which converts the generally sinusoidal output of the divider 7 into a series of short pulses having a duration of about 200 microseconds and a recurrence frequency of 50 pulses per second. The output from the pulse shaper 8 is used to control the action of the modulator 4, the tubes of which are biased well beyond cutoff so that the only time a 100 kc. signal is applied to the input of the amplifier 5 is during the 200 microsecond duration of each pulse output from the pulse shaper 8.

In order that the signal from the master station M may be distinguished from the signals radiated from the slave stations, the master transmitting apparatus is arranged to transmit three pulses and then skip two, transmit three and omit two, etc. To this end, a part of output from the divider 7 is fed to another frequency divider 9 which converts the 50 cycle input thereto to a ten cycle output. The ten cycle output signal is fed to a pulse shaper 10 which converts the generally sinusoidal output of the divider 9 into a square wave which is used to control the operation of the pulse shaper 8 by rendering the same inoperative during the negative half cycles of the output from the pulse shaper 10.

Fig. 3 illustrates graphically the wave form of the signals used in the above described apparatus. Graph (a) represents the sinusoidal 50 cycle output of the divider 7, and graph (b) represents the sinusoidal ten cycle output of the divider 9. Graph (c) shows how the pulse shaper 10 converts the sinusoidal input signal into a square wave output, and graph (d) shows the output from the pulse shaper 8. It will be noted that the pulse shaper 8 delivers an output only during the positive half cycles of the ten cycle square wave control signal so that the output of the pulse shaper 8 consists of three pulses spaced by pulse separation periods of 20,000 microseconds followed by two 20,000 microsecond periods in which no pulse is transmitted.

Fig. 4 represents graphically the signal radiated from the transmitting antennae. It consists of a carrier wave train having a frequency of 100 kc. and a duration of 200 microseconds followed by a period of non-radiation of a duration of 19,800 microseconds. The individual pulses thus contain approximately twenty cycles of the carrier frequency signal and recur at a rate of 50 pulses per second.

Fig. 5 shows the apparatus used at each of the slave transmitters. A crystal oscillator 11 is used as a source of 100 kc. radio frequency energy which is amplified by an amplifier 12 and passed through an electronic phase regulator 13 to a pulse modulator 14. From the modulator 14 the signal is passed to a power amplifier 15 which supplies a transmitting antenna 16.

The phase regulator 13 comprises a variable reactance stage of suitable type and is preferably constructed as described in my copending application Serial No. 612,985, filed August 27, 1945, now abandoned, and entitled "Radio Frequency Transmission Apparatus." The phase regulator operates to shift the phase of its output signal relative to the input by an amount which is proportional to the magnitude of a direct control potential derived from a phase discriminator 17. The phase discriminator 17, which may be of any suitable type but which is by preference constructed as described in my copending application Serial No. 612,991, filed August 27, 1945, Patent No. 2,500,200, granted March 14, 1950, and entitled "Multiple Channel Radio Frequency Receiver," operates to compare the phase of two input signals of like frequency and produce a direct control potential which is representative of the phase relation between the input signals.

One of the input signals to the discriminator 17 is derived from the transmitted signal, a portion thereof being picked up in a pick-up loop 18 placed near the antenna 16 and coupled to an amplifier 19. The output from the amplifier 19 is fed through a manual phase adjuster 20 to one of the input circuits of the discriminator 17. Because the output signal in the antenna circuit is intermittent, it is necessary to provide some means of supplying a signal to the input of the discriminator 17 during the spaces between the transmitted pulses. To this end, the amplifier 19 is provided with an automatic gain control, and the modulator 14 and power amplifier 15 are bypassed by another amplifier 21 which serves to apply a low level signal to the antenna circuit during the times separating the pulses. The amplifier 21 is adjusted so that the phase shifts therethrough are exactly the same as the phase shifts introduced by the modulator 14 and power amplifier 15. The output of the amplifier 19 is thus a continuous and uninterrupted signal of constant level.

The second input to the discriminator 17 is derived from a receiver 22 which is tuned to the master transmitter frequency of 100 kc. A loop or other directional antenna 23 is used to insure that only the master signal is received, it being recalled that all transmitters operate at the same frequency. The output of the receiver 22 is used, as will be described hereinafter, to synchronize the oscillator 11 so that its output exactly follows the master station. A portion of the oscillator output is passed through an amplifier 24, the output of which is fed as the second input to the discriminator 17.

The discriminator 17 and phase regulator 13 thus serve to hold a fixed and unchanging phase relation between the signals radiated from the master station and those radiated by the slave station. This phase relation is subject to adjustment at will by the manual phase adjuster 20, thus permitting the master and slave carrier signals to be radiated precisely in phase with each other.

The pulse modulator 14 serves to pulse modulate the slave transmissions in exactly the same way as the master signals are modulated. The control of the modulator 14 is effected by applying a part of the 100 kc. output of the oscillator 11 to a frequency divider 25 which produces from the 100 kc. input signal an output signal having a frequency of 1000 cycles per second. The output from the divider 25 is passed through a phase adjuster 26 to a second frequency divider 27 which divides the input frequency down to 200 cycles per second. This output is further divided by a frequency divider 28 to 50 cycles per second. The 50 cycle output signal from the divider 28 is passed to a pulse shaper 29 which operates to produce pulses having a duration of 200 microseconds and a pulse separation period of 20,000 microseconds corresponding to the recurrence rate of 50 pulses per second. The pulse output from the pulse shaper 29 is applied to the modulator 14 to control the same in the manner hereinbefore described in connection with the modulator 4 of the master transmitter. The signals radiated from the antenna 16 are therefore identical with the signals radiated by the master transmitter with the exception that the slave pulses recur continuously whereas the master pulses are intermittent to the extent that only three of every five are transmitted.

The manual phase adjuster 26 permits the time position of the pulses to be adjusted at will. This adjustment is made in such manner that the pulses from station A are radiated exactly 5,000 microseconds after the pulses from the master station M. Similarly, slave station B radiates its pulses 10,000 microseconds after the pulse is radiated from the master station, and slave station C radiates its pulses 15,000 microseconds after the master station. At the same time, the phase regulating apparatus operates to keep all of the carriers exactly in phase with each other. The way in which the adjustment of the pulse position is made will be described in detail hereinafter, it being sufficient at this time to realize that the pulse positions with respect to time are as above described.

Since the phase control equipment endeavours to hold in phase the signals of two independent oscillators, it is necessary to provide a frequency control to prevent the slipping of whole cycles. To this end the oscillator 11 is provided with a fine manual frequency control 30 which is used to manually adjust the oscillator frequency to equality with the frequency radiated from the master station. A part of the output from the receiver 22 is coupled through a switch 31 to the oscillator 11 in such a way as to hold the oscillator output in synchronism with the output of the receiver during the periods in which a receiver output is available; that is, during the 200 microsecond duration of each of the pulses received from the master transmitter. During the intervening periods of silence, the shift in output phase is so small as to be negligible since the periods without control are only 0.02 second in duration. With an oscillator having a stability of 5 parts per million, the maximum phase shift would be less than 4°, representing a time error of about $\frac{1}{10}$ microsecond. As each pulse is received, the oscillator is forced back into precise synchronism. The switch 31 is opened during adjustment of the fine frequency control 30, and closed to effect the automatic synchronization.

In order that spurious signals which might be received between pulses from the master station may not upset the operation of the system, there is provided an automatic gain control device which renders the receiver inoperative except during the time pulses are received. This gain control takes a 50 cycle signal from the output of the divider 28 which is passed through a phase shifter 32 to a pulse shaper 33. The output from the pulse shaper 33 is applied to the gain control bus of the receiver 22, a switch 34 being included in the circuit to allow the receiver to operate continuously during certain of the adjustments. The pulse shaper 33 converts the 50 cycle sinusoidal input signal into a series of pulses of somewhat longer duration than the pulses from the master station, 500 microseconds for example, and having a recurrence frequency of 50 pulses per second. The phase adjuster 32 allows the time of control pulse occurrence to be adjusted so that the receiver is rendered operative just before the pulse from the master station is received, and the greater duration of the control pulse insures that the receiver will remain operative for the entire duration of the received pulse.

The mobile receiving apparatus is illustrated in Fig. 6 as comprising a highly stable oscillator 35 which is provided with a manually operable fine frequency adjuster 36. The 100 kc. output of the oscillator 35 is applied to a frequency divider 37 where the frequency is reduced to 10 kc. and applied to a further frequency divider 38 which provides a 1,000 cycle output. The 1,000 cycle signal thus derived is passed through a manual phase adjuster 39 to an indicating and time measuring device 40 represented generally in Fig. 6 by the rectangle bearing that reference character, and which is illustrated in detail in Fig. 7 as comprising a cathode ray tube with associated control circuits.

The 1,000 cycle signal from the phase adjuster 39 is applied to the primary winding 41 of a transformer 42, the secondary winding 43 of which is center tapped and grounded as shown at 44. The winding 43 is tuned to 1,000 cycles as by a shunt connected condenser 45, and the ends of the winding 43 are connected to the control grids of a pair of pentode amplifier tubes 46 and 47. The cathodes of these tubes are connected together and to ground through a cathode bias resistor 48 which is bypassed as by a condenser 49. The suppressor grids of the tubes are connected to the cathodes, and the plates of the tubes are connected to one pair of deflection plates 50 and 51 of a cathode ray tube 52. A suitable source of direct operating potential represented simply by the legend "B+" is connected to each of the plates through plate load resistors 53 and 54.

The ends of the winding 43 are connected through condensers 55 and 56 and switches 57 and 58 to the terminals of an inductance 59 which is tuned to 1,000 cycles as by a condenser 60. The center of the inductance 59 is grounded as shown at 61, and the ends are connected respectively to the control grids of a second pair of pentode amplifying tubes 62 and 63. The cathode and suppressor grid circuits of the tubes 62 and 63 are identical with the corresponding circuits for the tubes 46 and 47. The plates are also coupled to the source of direct operating potential in the same way, and are connected to the second pair of cathode ray tube deflecting plates 64 and 65. The tuning of the coils 43 and 59 and the capacities of condensers 55 and 56 are so adjusted as to make the voltage across the coil 43 bear a phase quadrature relationship to the voltage across the coil 59. By this means there is applied to the cathode ray tube deflection plates 50—51 and 64—65 a 1,000 cycle two-phase voltage which causes the cathode ray spot to traverse a circular orbit on the tube screen at the rate of 1,000 R. P. S. and at a radius which is determined by the peak value of the 1,000 cycle voltage.

In the receiving apparatus, Fig. 6, a portion of the 1,000 cycle output from the divider 38 is connected through a phase adjuster 66 to a frequency divider 67 serving to produce a 200 cycle output. This 200 cycle signal is used to synchronize the operation of a saw-tooth wave generator 68 for generating a saw-tooth wave of the character illustrated in graph (a) of Fig. 8. As is indicated thereon, the period of each cycle of the saw-tooth wave is 5,000 microseconds. This signal is applied to the indicating device 40 by means of a circuit including a switch 69.

Within the indicating device 40 (see Fig. 7) the saw-tooth wave is applied to the primary winding 70 of a transformer 71, the secondary winding 72 of which is connected as by means of a bus 73 to the screen grids of each of the tubes 46, 47, 62, and 63. The other terminal of the winding 72 is connected through windings 74 and 75 (the function of which will appear hereinafter) to a suitable source of direct operating potential represented by the legend "B+." The saw-tooth wave thus serves to vary the gain of the tubes 46, 47, 62 and 63 to correspondingly vary the voltage of the two-phase supply to the cathode ray tube deflection plates. Since the cathode ray spot makes one revolution in 1,000 microseconds, and since the period of the saw-tooth wave is 5,000 microseconds, it is seen that by this means the cathode ray spot is caused to repeatedly trace a five turn spiral on the screen of the tube. If the tube has a working diameter of five inches, this spiral has a length of about 78 inches. As a time base representing 5,000 microseconds, it is seen that the time sensitivity of the trace is about 1/64 inch per microsecond.

A part of the 200 cycle output from the divider 67 (see Fig. 6) is applied to a frequency divider 76 which produces a 50 cycle output signal. The 50 cycle signal is fed through a phase shifter 77 to a pulse shaper 78 operating to convert the sinusoidal input into a pulse signal in which each pulse has a duration of 5,000 microseconds and a repetition rate of 50 pulses per second as is represented by graph (b) of Fig. 8. This 50 cycle pulse signal is applied to the indication device 40, within which (see Fig. 7) the signal is applied to the primary winding 79 of a transformer 80. The secondary winding 81 of the transformer 80 is connected in circuit between the control grid 82 (which controls the brightness of the cathode ray spot) and the battery 83 or other source of operating potential for the cathode ray tube. The focusing and accelerating electrodes of the cathode ray tube may be connected to the same battery 83 in the conventional manner.

The normal bias of the cathode ray tube control grid 82 and the voltage of the 50 cycle pulse are so adjusted that the cathode ray spot is extinguished during the intervals between pulses and bright for the duration of each pulse. Thus the spot is caused to traverse one spiral every 20,000 microseconds, and the spiral having a duration of 5,000 microseconds. The aforementioned phase shifter 77 is preferably arranged as a tap switch or similar definite position switch means capable of shifting the phase of the 50 cycle signal exactly 90° upon movement of the switch from one of its four positions to the next. This shifts the pulse output of the pulse shaper 78 by exactly 5,000 microseconds for each position of the switch. Graphs (b), (c), (d) and (e) of Fig. 8 represent the four positions in time of the pulse signal corresponding to the four positions of the phase shifter 78.

By the means just described, the full 20,000 microsecond period between pulses radiated by the transmitting system is divided into four quarter periods of 5,000 microseconds each, and the phase shifter 78 allows any one of these quarter periods to be represented by the five turn spiral trace.

The receiving apparatus includes also a receiving means 84 which is tuned to 100 kc. and connected to an omnidirectional aerial to receive the transmissions from each of the four stations of the system. The output from the receiver 84 is passed through a gate circuit 85 and a limiter device 86 to the indicating device 40. Within the indicating device 40 (see Fig. 7) the received signal is applied to the primary winding 87 of a transformer 88, the aforementioned secondary 74 of which is included in the screen grid circuit for the tubes 46, 47, 62, and 63. By this means the cathode ray spot is deflected radially by the received signal to produce on the screen a display such as that illustrated in Fig. 10.

The gate circuit 85 is so controlled as to connect the receiver output to the indicating device 40 only during each of the quarter periods represented by the spiral trace. To this end a part of the 50 cycle signal from the four-step phase shifter 77 is passed through a pulse shaper 89 which produces an output signal similar to that shown by graph (b) of Fig. 8 but which differs therefrom by having a sufficiently longer pulse duration to insure that the receiver will be connected operatively to the indicating device 40 for the entirety of the quarter period represented by the spiral trace. The output from the pulse shaper 89 is applied to control the gate circuit 85 in a conventional manner.

Preferably there is also employed a gain control circuit 90 of conventional type with a relative slow response connected to the output side of the gate circuit and arranged to control the gain of the receiver 84 so as to maintain the output signal at a desired level.

To use the receiving apparatus to determine its location from the received signals, the first step is the adjustment of the time base to equality with the repetition rate of the transmitted signals. This is accomplished by adjusting the frequency of the oscillator 35 by means of the fine control 36. Improper adjustment is detected by noting a motion of the signal image around the time base spiral. In order to amplify this motion, a part of the 10 kc. signal from the divider 37 is fed directly to the indicating device 40 where it is applied to the primary winding 91 of a transformer 92 (see Fig. 7). The secondary winding 93 of the transformer 92 has its center grounded and its terminals connected respectively to alternate poles of the switches 57 and 58, so that by throwing these switches to positions alternate to those illustrated in Fig. 7, the 10 kc. signal from the divider 37 may be impressed across the coil 59 to apply a 10 kc. signal to the cathode ray tube deflecting plates 64 and 65. Since the plates 50 and 51 are energized at 1,000 cycles, the cathode ray spot is caused to trace on the screen a rather complicated pattern such as is illustrated in Fig. 9. In such a pattern, the signal image will move more rapidly for a given extent of maladjustment of the time base than in the spiral pattern, thus facilitating the accurate adjustment of the time base.

When the oscillator is properly adjusted, the switches 57 and 58 are restored to their normal positions to produce the spiral trace, and the phase shifter 77 is moved from step to step until the master transmission is displayed on the screen. The master signal can be identified by the fact that only three of each five pulses are transmitted, thus producing an image which is only about one half as intense as that produced by the slave transmissions. Having found the master signal, the phase adjuster 66 is manipulated to shift the signal image into the third or center turn of the spiral. Then the phase adjuster 39 is operated to rotate the spiral to bring the beginning and end thereof into alignment with the scale index, it being understood that the face of the cathode ray tube is fitted with a suitable scale for measuring the time intervals. This scale is preferably circular with radially disposed graduation numbered from zero to 1,000 starting at a suitably marked index. The scale may be divided into 500 or 1,000 parts to allow direct measurement of the time intervals to the nearest microsecond.

The next step in the adjustment is to open switch 69 so as to replace the spiral trace with a circular trace, as shown in Fig. 11, and then the phase adjuster 66 is carefully manipulated to bring the beginning of the signal image into register with the scale index as is shown in Fig. 12. The precise adjustment is to bring the index in line with the intersection of the circular trace and the finish of the third half cycle of the signal image, as is shown in Fig. 13. This completes the adjustment of the time base.

To obtain the time difference measurement for the pair of stations comprising the master station M and the slave station A, the phase shifter 77 is moved clockwise one step. As was explained in connection with Fig. 8, this shifts the time base exactly 5,000 microseconds. Since, as has been explained, the pulses from station A are caused to be radiated exactly 5,000 microseconds after the radiation of the corresponding pulse from station M, the signal trace which now appears on the tube screen is that resulting from the reception of station A. The signal may appear in a position such as is shown in Fig. 14, it being understood that switch 69 is closed to produce the spiral trace. The number of thousands of microseconds of time difference is then determined by counting the turn number of the spiral in which the signal trace is found. As shown, the spot traverses the spiral from the inside out, so the count would be about 1.8 and the figure in the thousands column would be "1."

The switch 69 is then opened to produce the circular trace and the next three figures are read from the scale, the reading being taken at the intersection of the zero signal line with the end of the third half cycle of the signal image. The reading in the case illustrated in Fig. 11 would be approximately 730, so that the delay time thus measured is 1730 microseconds, corresponding to a path difference of 519 kilometers.

The operations just described are repeated for each of the three slave stations, station B being picked up by advancing the phase shifter 77 another step, a still further step forward on the phase shifter 77 bringing in station C.

It will be apparent that the accuracy of the above described operation depends upon maintaining the proper synchronization of the transmitters of the system. To this end there is provided monitoring equipment at each of the slave stations. As is shown in Fig. 5, the monitoring equipment includes an indicating device 40, identical with that shown in Fig. 7, together with a 200 cycle saw-tooth generator 94 and switch 95, and a 50 cycle pulse shaper 96 and four-step phase shifter 97. Into the indicating device 40 there is fed the 1,000 cycle signal for the circular trace, the 200 cycle saw-tooth for the spiral, the 50 cycle pulse from the pulse shaper 96 for selecting which quarter period is represented on the screen, the master signal as received by the receiver 22, and the 50 cycle pulse which is used to control the modulator 14. The last mentioned signal is applied to the primary winding 98 of a transformer 99 (see Fig. 7), the aforementioned secondary 75 of which is included in the screen grid circuit for the tubes 46, 47, 62, and 63, so that the pulse signal effects a radial deflection of the trace.

Since the distance separating the master and slave stations is known, the time lapse between the reception of the master pulse and the transmission of the slave pulse required to produce a delay of exactly 5,000 microseconds is also known. The phase adjuster 26 permits the slave transmitter to be so regulated as to maintain this time difference as read on the indicating device 40 in the manner hereinbefore described.

From the foregoing, it will be observed that the navigation system of this invention is particularly characterized by embodying the advantages of a long wave system and the advantages of a pulse system. This combination is made possible by the employment of the hereinbefore described means for measuring with extreme accuracy the difference in the times of arrival at the receiver location of the pulses radiated from a plurality of spaced points. The high timing accuracy is made possible by the phase synchronizing of the carrier signals. The actual basis for the time measurements is the phase relation of the received carrier trains. Thus errors in the time of pulse initiation do not affect the accuracy of the reading so long as these errors are less than one half cycle of the carrier frequency.

While there has been shown and described the preferred embodiment of this invention, the same is not to be limited to the details of construction shown herein, except as defined in the appended claims.

I claim:

1. In a radio frequency navigation system, the combination of: a master and a slave transmitting station spaced from each other; transmitting means at each of said stations for radiating therefrom carrier waves of like frequency pulse modulated at identical pulse recurrence rates and like pulse durations; receiving means at said slave station for receiving the radiations from said master station; a phase discriminator at said slave station coupled to the transmitting means thereat and to said receiving means responsive to the phase relation between the carrier waves radiated from said master and said slave stations; and a phase regulator coupled to the transmitting means at said slave station and actuated by said phase discriminator for maintaining fixed the phase relation of said carrier waves.

2. In a radio frequency navigation system, the combination of: a master and a slave transmitting station spaced from each other; transmitting means at each of said stations for radiating therefrom carrier waves of like frequency pulse modulated at identical pulse separation periods and like pulse durations; receiving means at said slave station for receiving the radiations from said master station; a phase discriminator at said slave station coupled to the transmitting means thereat and to said receiving means responsive to the phase relation between the carrier waves radiated from said master and said slave stations; a phase regulator coupled to the transmitting means at said slave station and actuated by said phase discriminator for maintaining fixed the phase relation of said carrier waves; and means for delaying the radiation of each pulse from said slave station a fractional part of said pulse separation period.

3. In a radio frequency navigation system, the combination of: a master and a slave transmitting station spaced from each other; transmitting means at each of said stations for radiating therefrom carrier waves of like frequency pulse modulated at identical pulse recurrence rates and like pulse durations; receiving means at said slave station for receiving the radiations from said master station; a phase discriminator at said slave station coupled to the transmitting means thereat and to said receiving means responsive to the phase relation between the carrier waves radiated from said master and said slave stations; a phase regulator coupled to the transmitting means at said slave station and actuated by said phase discriminator for maintaining fixed the phase relation of said carrier waves; and a mobile receiving apparatus including means for receiving the radiations from said stations, and time measuring means actuated by said receiving means for measuring the difference in time between the reception of pulses from each of said stations.

4. In a radio frequency navigation system, the combination of: a master and a slave transmitting station spaced from each other; transmitting means at each of said stations for radiating therefrom carrier waves of like frequency pulse modulated at identical pulse separation periods and like pulse durations; receiving means at said slave station for receiving the radiations from said master station; a phase discriminator at said slave station coupled to the transmitting means thereat and to said receiving means responsive to the phase relation between the carrier waves radiated from said master and said slave stations; a phase regulator coupled to the transmitting means at said slave station and actuated by said phase discriminator for maintaining fixed the phase relation of said carrier waves; means for delaying the radiation of each pulse from said slave station a fractional part of said pulse separation period; and a mobile receiving apparatus including means for receiving the radiations from said stations, a cathode ray tube, means for producing on the screen of said tube a multi-turn spiral time base trace representing from beginning to end a known duration less than said separation period, and means coupling said tube to said receiving means for producing a radial deflection of said trace upon reception of a pulse from said transmitting stations.

5. In a radio frequency navigation system, the combination of: a master and a slave transmitting station spaced from each other; transmitting means at each of said stations for radiating therefrom carrier waves of like frequency pulse modulated at identical pulse recurrence rates and like pulse durations; receiving means at said slave station for receiving the radiations from said master station; a phase discriminator at said slave station coupled to the transmitting means thereat and to said receiving means responsive to the phase relation between the carrier waves radiated from said master and said slave stations; a phase regulator coupled to the transmitting means at said slave station and actuated by said phase discriminator for maintaining fixed the phase relation of said carrier waves; and means for periodically interrupting the radiation from the transmitting means at said master station to thereby distinguish the radiations therefrom.

6. In a radio frequency navigation system, the combination of: a master transmitting station and a slave transmitting station spaced from each other; and transmitting means at said stations for radiating therefrom carrier waves of like frequency pulse modulated at identical pulse recurrence rates and like pulse durations, the transmitting means at said master station comprising a first stable crystal oscillator, a master antenna for radiating one of said carrier waves coupled to said oscillator, a pulse modulator interposed between said oscillator and said master antenna, a frequency dividing pulse shaping circuit having an input coupled to said oscillator for producing master modulation pulses having a recurrence frequency equal to a sub-multiple of the frequency of said carrier wave and spaced in time by an exact number of cycles of the output of said oscillator, and means for applying said master modulation pulses to said pulse modulator, the transmitting means at said slave station comprising a second stable crystal oscillator having frequency adjusting means so adjusted as to produce an output having a frequency which is substantially equal to the output frequency of said first oscillator, carrier wave receiving means for receiving the carrier wave radiated from said master antenna and coupled to said second oscillator for synchronizing said second oscillator with said first oscillator to hold said second oscillator fixed in phase relative to said first oscillator, a second frequency dividing pulse shaping circuit having an input coupled to said second oscillator and producing slave modulation pulses identical to said master modulation pulses but differing in time of occurrence by an exact number of cycles of said carrier waves, a slave antenna for radiating the other of said carrier waves coupled to said second oscillator, a slave pulse modulator interposed between said second oscillator and said slave antenna, and means for applying said slave modulation pulses to said slave pulse modulator.

7. A radio navigational aid comprising means for radiating from one location a first pulse modulated carrier wave of the interrupted continuous wave type in which the number of carrier wave cycles in each pulse is less than one hundred and in which the time spacing between pulses is at least three times the duration of each pulse and an exact full number multiple of the duration of one cycle of said first carrier wave; means for radiating from another location a second pulse modulated carrier wave identical to said first pulse modulated carrier wave; means for producing each of the pulses of said second pulse modulated carrier wave a fixed time after the production of corresponding pulses of said first pulse modulated carrier wave, said fixed time being greater than the duration of said pulses; a mobile receiver for receiving said pulse modulated carrier waves having a crystal oscillator timer; means for synchronizing said timer with one of said carrier waves to provide a standard of time to indicate a deviation in said fixed time; and means for maintaining a fixed radio frequency phase relation between said first and second carrier waves, whereby the phase of the received carrier waves may be used for standardizing said timer and for indicating said time deviation.

8. A radio navigational aid comprising a plurality of transmitting stations each having transmitting means thereat for radiating a series of pulses having the same pulse repetition rate and pulse duration, each pulse being in the form of a train of carrier waves and the carrier waves from different transmitting stations being of the same frequency; and means for synchronizing both the pulses and the phase of the carrier waves transmitted by said stations so that each individual carrier wave cycle in the pulses from one station occupies the same positions in the pulses as a corresponding carrier wave cycle in the pulses from another station.

9. A radio navigational aid comprising a plurality of transmitting stations each having transmitting means thereat for radiating a series of pulses having the same pulse repetition rate and pulse duration, each pulse being in the form of a train of carrier waves and the carrier waves from different transmitting stations being of the same frequency; means for synchronizing both the pulses and the phase of the carrier waves transmitted by said stations so that each individual carrier wave cycle in the pulses from one station occupies the same positions in the pulses as a corresponding carrier wave cycle in the pulses from another station; and receiving means including means for receiving said series of pulses and means for measuring the time interval between the reception of corresponding carrier wave cycles in the pulses from different transmitting stations.

WILLIAM JOSEPH O'BRIEN.

REFERENCES CITED

The following references are of record in the file of this patent:

UNITED STATES PATENTS

| Number | Name | Date |
| --- | --- | --- |
| 2,028,880 | Runge et al. | Jan. 28, 1936 |
| 2,407,287 | Labin | Sept. 10, 1946 |
| 2,408,048 | Deloraine et al. | Sept. 24, 1946 |
| 2,419,525 | Alford | Apr. 29, 1947 |
| 2,431,305 | Chatterjea et al. | Nov. 25, 1947 |

FOREIGN PATENTS

| Number | Country | Date |
| --- | --- | --- |
| 735,055 | France | Nov. 3, 1932 |
| 581,602 | Great Britain | Oct. 18, 1946 |